United States Patent [19]

Grimes et al.

[11] 4,302,155
[45] Nov. 24, 1981

[54] AIR CRAFT PROPELLER ASSEMBLY WITH COMPOSITE BLADES

[75] Inventors: Richard V. Grimes; W. Benjamin Harlamert, both of Piqua, Ohio; David F. Thompson, Chester, Pa.

[73] Assignee: Hartzell Propeller, Inc., Piqua, Ohio

[21] Appl. No.: 1,961

[22] Filed: Jan. 8, 1979

[51] Int. Cl.³ .................. B64C 11/06; B64C 11/26
[52] U.S. Cl. .................... 416/144; 416/230; 416/241 A; 416/248
[58] Field of Search ............... 416/229, 230 R, 230 A, 416/241 A, 144, 233, 248

[56] References Cited

U.S. PATENT DOCUMENTS

| | | | |
|---|---|---|---|
| 1,503,170 | 7/1924 | Smith | 416/233 |
| 2,182,812 | 12/1939 | Lougheed | 416/230 R |
| 2,240,873 | 5/1941 | Thomas | 416/248 |
| 2,306,177 | 12/1942 | Mattson | 416/233 |
| 2,465,007 | 3/1949 | Bragdon et al. | 416/144 |
| 2,659,444 | 11/1953 | Stanley | 416/229 |
| 2,485,827 | 10/1949 | Hartzell | 416/230 R |
| 2,765,859 | 10/1956 | Hartzell et al. | 416/229 |
| 3,021,246 | 2/1962 | Hutter et al. | 416/230 A |
| 3,321,019 | 5/1967 | Dmitroff et al. | 416/230 A |
| 3,380,535 | 4/1968 | Biermann | 416/46 |
| 3,477,796 | 11/1969 | Weiland | 416/229 |
| 3,554,664 | 1/1971 | Cheeseman et al. | 416/230 R |
| 3,637,325 | 1/1972 | Morley | 416/230 R |
| 3,664,764 | 5/1972 | Davies et al. | 416/230 R |
| 3,695,778 | 10/1972 | Taylor | 416/233 |
| 4,097,189 | 6/1978 | Harlamert | 416/46 |

FOREIGN PATENT DOCUMENTS 525414 8/1940 United Kingdom ............... 416/233

Primary Examiner—John J. Vrablik
Attorney, Agent, or Firm—Jacox & Meckstroth

[57] ABSTRACT

An adjustable pitch aircraft propeller has peripherally spaced composite blades each including an elongated core of expanded rigid foam material extending from a metal base member having a reduced neck portion and an outwardly projecting flange portion. A casing or skin of plastic resin impregnated fabric material surrounds the core of each blade and extends inwardly along the neck portion and also has a flange portion overlying the flange portion of the base member. The skin material overlying the neck portion of the base member is retained by a filament winding impregnated with plastic resin, and the blade is coupled to the propeller hub by an annular lip portion which projects inwardly and overlies the flange portion of the skin material. The foam core of each propeller blade has longitudinally extending slots, and strips of resin impregnated fabric material extend through the slots to form corresponding webs which connect the skin material forming opposite side of the propeller blade.

9 Claims, 3 Drawing Figures

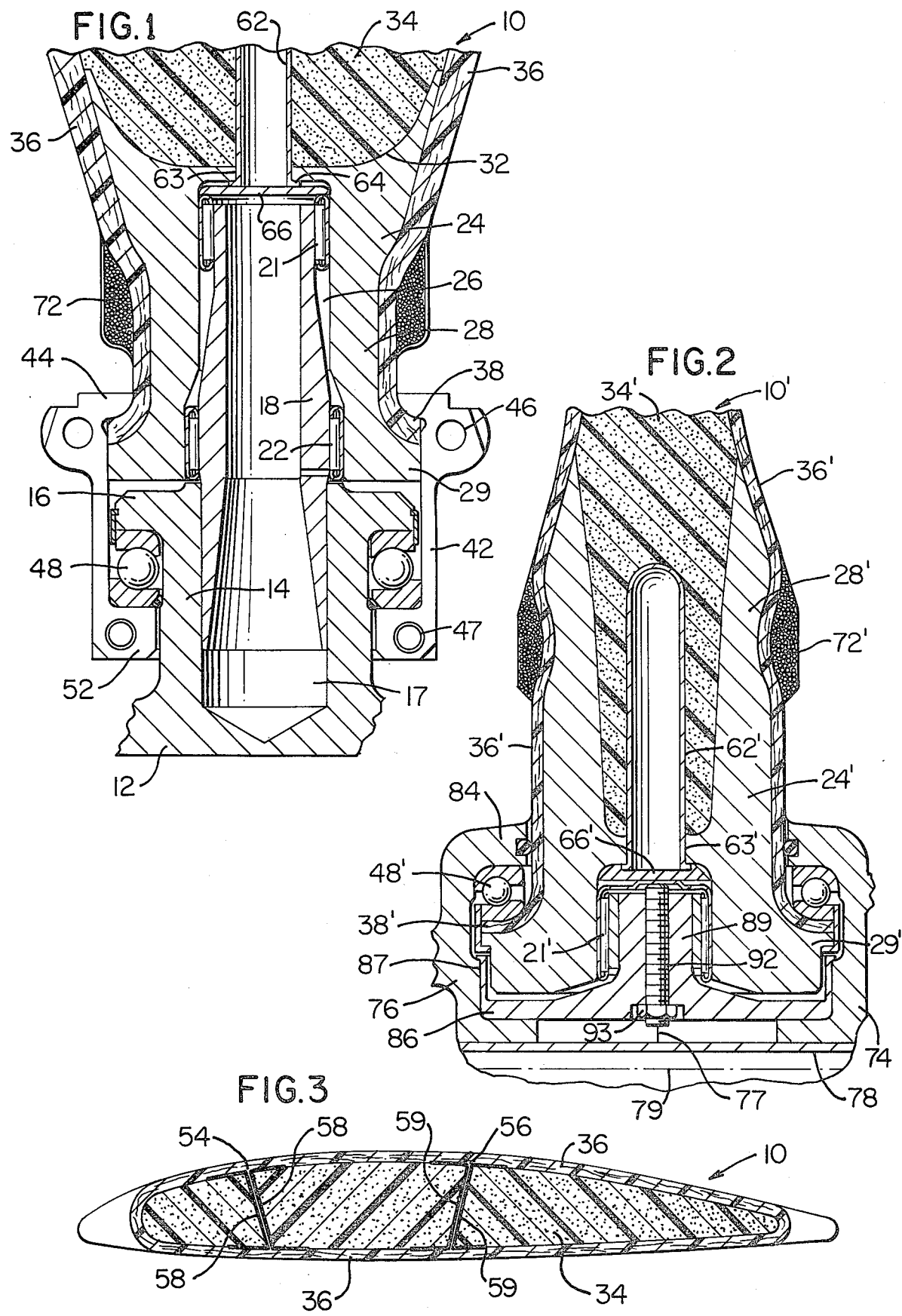

AIR CRAFT PROPELLER ASSEMBLY WITH COMPOSITE BLADES

BACKGROUND OF THE INVENTION

In a variable or adjustable pitch aircraft propeller assembly of the general type disclosed in U.S. Pat. Nos. 3,380,535 and 4,097,189 which issued to the assignee of the present invention, it has been found desirable on some aircraft to reduce the tip speed of the propeller blades for reducing the noise level produced by the rotating propeller. To accomplish the blade tip speed reduction without a reduction in thrust or performance, it is necessary to increase the diameter of the propeller and to rotate the propeller at a lower RPM to provide a predetermined maximum tip speed, for example, of 850 feet per second. While it is necessary to increase the diameter of the propeller, it is also desirable to reduce the weight of the propeller, and such reduction may be obtained by constructing each propeller blade of composite materials including reinforced synthetic plastic materials in place of metal. A number of composite aircraft propeller blade assemblies have been either constructed or proposed, for example, as disclosed in U.S. Pats. Nos. 2,182,812, 2,485,827, 3,021,246, 3,554,664 and 3,664,764.

SUMMARY OF THE INVENTION

The present invention is directed to an improved aircraft propeller assembly which incorporates a propeller hub supporting a plurality of two or more composite blades each including relatively light weight synthetic plastics materials. A composite propeller blade constructed in accordance with the invention provides a substantially high strength/weight ratio in addition to substantial durability and is adapted to be produced by a simplified method.

In general, a composite propeller blade assembly constructed in accordance with the invention preferably incorporates a metal base plug or member having an inner flange portion and an annular recess defining a neck portion of reduced diameter. The base member also has a cavity which receives a core of rigid foam material, and the core is surrounded by overlapping layers of plastic resin impregnated fabric material forming a rigid skin on the foam core. The impregnated fabric material continues inwardly along the base member conforming to the neck portion and also projects outwardly to form a flange portion overlying the flange portion of the base member.

The flange portion of the impregnated fabric skin and the flange portion of the metal base member are retained by an overlying lip portion of a split retention collar or a split propeller hub. The fabric skin is also restrained within the neck portion of the base member by a resin impregnated filament winding. A balancing tube projects outwardly from the base member into the foam core, and the core has outwardly extending diverging slots through which extend resin impregnated fabric strips forming tie webs through the foam core for the opposite side skins of the propeller blade.

Other features and advantages of the invention will be apparent from the following description, the accompanying drawing and the appended claims.

BRIEF DESCRIPTION OF THE DRAWING

FIG. 1 is a fragmentary longitudinal or axial section of a composite aircraft propeller blade constructed in accordance with the invention and showing its assembly to a propeller hub;

FIG. 2 is an axial section similar to FIG. 1 and showing another embodiment of the invention; and FIG. 3 is a typical transverse cross-section of a composite aircraft propeller blade which is shown partially in FIGS. 1 and 2.

DESCRIPTION OF THE PREFERRED EMBODIMENTS

FIG. 1 illustrates the base portion of a composite aircraft propeller blade 10 constructed in accordance with the invention and also shows how the blade is supported for rotation by a propeller hub 12 having an outwardly projecting hub spider or portion 14 for each propeller blade. Each hub portion 14 has an outer circular flange 16 and an inner cylindrical bore 17. A blade support or pilot tube 18 has an inner end portion pressed into the bore 17, and the outer end portion of the tube 18 carries a set of axially spaced anti-friction bearings 21 and 22.

The propeller blade 10 includes a metal shank or base member 24 which is circular in cross-section and has a stepped center bore 26 for receiving the pilot tube 18 and the bearings 21 and 22 which support the base member 24 for rotation on a radial axis. The base member 24 includes a cylindrical neck portion 28 which extends from an outwardly projecting flange portion 29. The base member 24 also has a cup-shaped outer end portion which defines a cavity 32, and a core 34 of expanded polyurethane foam material extends from the cavity 32 radially outwardly for a substantial part of the radial length of the propeller blade 10.

The foam core 34 is shaped or contoured to the desired contour of the propeller blade, and the outer surfaces of the core is covered with overlapping layers of plastic resin impregnated fabric material to form a rigid skin 36. The skin 36 completely covers the foam core 34 and extends radially outwardly from the core 34 to form the blade tip portion. Preferably, the skin 36 is formed by multiple overlapping layers of an aramid fabric which is preimpregnated with an epoxy material so that when the material sets, the combined fabric and epoxy material form a hard durable casing or skin.

As shown in FIG. 1, the overlapping layers of resin impregnated fabric material forming the skin 36 continue inwardly along the outer surface of the metal base member 24, overlying the neck portion 28 and then projecting outwardly to form a flange portion 38 overlying the flange portion 29 of the metal base member 24. Preferably, the outer cylindrical surfaces of the flange portions 29 and 38 are machined simultaneously so that the surface is smooth and the flange portions have a uniform outside diameter.

The composite propeller blade 10 is retained on the pilot tube 18 by a pair of opposing split collar sections 42 which have a lip portion 44 surrounding the neck portion 28 of the base member 24 and projecting inwardly over the flange portion 38 of the skin 36. The opposing and mating generally semi-cylindrical collar sections 42 are coupled together by bolts which extend through the holes 46 and 47. The collar sections 42 confine an anti-friction thrust bearing 48 which is disposed between the flange 16 of the hub portion 14 and an inner flange portion 52 of the mating collar sections 42.

Referring to FIG. 3, the rigid foam core 34 of the composite propeller blade 10 is provided with a set of diverging slots 54 and 56 which extend radially inwardly from the outer radial end of the foam core 36 to the inner portion of the foam core. Before the core 34 is overlayed with the multiple overlapping layers of resin impregnated fabric to form the skin 36, a pair of strips of the resin impregnated fabric are inserted into each of the slots 54 and 56 to form a composite forward tie web 58 and an aft tie web 59. After each strip of resin impregnated fabric material is inserted into one of the slots 54 or 56, the outer longitudinally extending edge portions of the strip are folded adjacent the outer side surfaces of the foam core to provide the strip with a C-shaped cross-sectional configuration. Thus the pair or set of strips within each of the slots 54 and 56 form generally an H-shaped tie web for rigidly securing the opposite side faces of the skin 36.

Referring again to FIG. 1, a metal balancing weight tube 62 is supported by the base member 24 and extends radially outwardly through a center hole 63 into the foam core 34. The tube 62 has a base flange 64 which engages a circular disc 66 mounted on the outer bearing 21. The tube 62 is adapted to receive a predetermined amount of balancing weight material, for example, material in the form of "lead wool".

As also shown in FIG. 1, the resin impregnated fabric skin 36 is rigidly secured to the neck portion 28 of the base member 24 by a winding 72 of flexible plastic line or filament which is wrapped firmly around the skin 36 overlying the neck portion 28. The winding 72 is impregnated with the same plastic or epoxy resin material as used in the skin 36 and which sets or hardens to form a rigid band or collar.

Another embodiment or modification of an aircraft propeller assembly is illustrated in FIG. 2 and is ideally suited for relatively smaller and lighter weight aircraft propellers wherein the propeller hub is formed by two mating or opposing split sections 74 and 76. The hub sections join along an Interface 77 and are mounted on a tube 78 which is concentric with the rotary axis 79 of the aircraft propeller and the engine drive shaft. The hub sections 74 and 76 are preferably formed of aluminum and cooperate to form an inwardly projecting lip portion 84. Since the composite propeller blade 10' illustrated in FIG. 2 incorporates components similar to the corresponding components described above in connection with the propeller blade 10 shown in FIG. 1, the components in FIG. 2 are identified with corresponding reference numbers with the addition of a prime mark.

In place of the pilot or support tube 18 described above in connection with FIG. 1, the embodiment illustrated in FIG. 2 employs a generally cylindrical support member 86 for each blade 10', and each support member 86 is confined within a corresponding cylindrical bore or cavity 87 formed within the opposing hub sections 74 and 76. The support member 86 includes a center support post or shaft 89 which carries a bearing 21' for rotatably supporting the base member 24' of the blade 10'. As also apparent in FIG. 2, the thrust bearing 48' is located between the lip portion 84 of the hub sections 74 and 76 and the skin flange portion 38' which overlies the flange portion 29' of the base member 24'. The center support shaft 89 also carries a radially extending screw 92 which provides for preloading the thrust bearing 48' after which the screw 92 is secured by a lock nut 93. In all other respects, the propeller blade assembly shown in FIG. 2 is constructed in the same manner as the blade assembly shown in FIG. 1.

From the drawing and the above description, it is apparent that an aircraft propeller assembly constructed in accordance with the present invention, provides desirable features and advantages. That is, not only does the construction of each composite blade 10 or 10' provides for significantly reducing the weight of the propeller assembly to permit the manufacture of larger diameter propellers, but also the means for coupling each blade to the corresponding propeller hub provide for a positive retention of the skin of the composite blade while also simplifying the method of producing each blade. In particular, the retention of the resin impregnated fabric skin within the neck portion of the base member 24 or 24' by means of the impregnated filament winding 72 or 72', cooperates with the retention of the skin flange portion 38 or 38' by the lip portion 44 or 84 to provide for positive and dependable retention of the skin surrounding the foam core of each blade in addition to positive and dependable retention or coupling of the blade to the propeller hub. Furthermore, the arrangement and assembly of the angled impregnated fabric webs 58 and 59 within each propeller blade provide for proper blade stiffness to resist torsion and bending forces acting on the blade. The angled webs also improve impact resistance by providing a secondary load path across the foam core and further aid in pressurizing the webs during curing of the composite blade assembly.

While the propeller assemblies herein described constitute preferred embodiments of the invention, it is to be understood that the invention is not limited to these precise propeller assemblies, and that changes may be made therein without departing from the scope and spirit of the invention as defined in the appended claims.

The invention having thus been described, the following is claimed:

1. An aircraft propeller assembly comprising a rotatable propeller hub supporting a plurality of radially extending composite propeller blades, each of the composite blades including an elongated core of substantially rigid plastics material, a skin of plastic resin impregnated material surrounding the core, a rigid base member supporting the core and having an outwardly projecting inner circular flange portion integrally connected to a neck portion of reduced outside diameter, the skin material continuing radially inwardly along the neck portion and flange portion of the base member in overlying relation and having a flange portion projecting outwardly adjacent the flange portion of the base member, means surrounding the skin material overlying the neck portion of the base member and rigidly securing the skin material to the base member, means connected to the propeller hub and including a retention lip portion substantially surrounding the base member radially outwardly of the flange portion of the skin material, at least one longitudinally extending slot within the core, said slot being disposed at an acute angle relative to the chord of the blade, at least one strip of plastic resin impregnated material extending longitudinally within the slot, and the strip having longitudinally edge portions underlying and bonded to the skin material forming opposite sides of the blade.

2. A propeller assembly as defined in claim 1 wherein a plurality of the strips are disposed within the slot, and each strip has generally a C-shaped cross-sectional configuration.

3. A propeller assembly as defined in claim 1 wherein the core has two of the slots disposed in spaced relation, and a plurality of the strips are disposed within each slot.

4. A propeller assembly as defined in claim 8 wherein the slots are arranged in converging relation and extend outwardly to the outer end of the core to provide for sliding the strips longitudinally into the slots from the outer end of the core.

5. An aircraft propeller assembly comprising a rotatable propeller hub supporting a plurality of radially extending composite propeller blades, each of said composite blades including an elongated core of substantially rigid material, a skin of plastic resin impregnated material surrounding said core, a rigid base member supporting said core and having an outwardly projecting inner flange portion integrally connected to a neck portion of reduced outside diameter, means defining a bore within said base member, means connected to said propeller hub and supporting a bearing within said bore to provide for rotating said blade relative to said hub, said skin material on said blade continuing radially inwardly along said neck portion of said base member in overlying relation and having a skin flange portion projecting laterally outwardly adjacent said flange portion of said base member, a plastic impregnated element extending around said skin material surrounding said neck portion and spaced radially outwardly from said skin flange portion for forming a first rigid connection of said skin material to said base member, means connected to said propeller hub and including an inwardly projecting retention lip portion substantially surrounding said base member, and said lip portion being disposed radially between said skin flange portion and said plastic impregnated element extending around said skin material for forming a second rigid connection of said skin material to said base member.

6. A propeller assembly as defined in claim 5 wherein said base member defines a radially outwardly facing cavity, said core material comprises an expanded rigid foam material extending into said cavity, and a balancing weight tube supported by said base member and projecting outwardly into said foam material within said cavity.

7. A propeller assembly as defined in claim 5 wherein said skin flange portion terminates with an outer edge having a diameter the same as the diameter of said flange portion of said base member.

8. An aircraft propeller assembly comprising a rotatable propeller hub supporting a plurality of radially extending composite propeller blades, each of said composite blades including an elongated core of substantially rigid material, a skin of plastic resin impregnated material surrounding said core, a rigid base member supporting said core and having an outwardly projecting inner flange portion integrally connected to a neck portion of reduced outside diameter, means defining a bore within said base member, means connected to said propeller hub and supporting a bearing within said bore to provide for rotating said blade relative to said hub, said skin material on said blade continuing radially inwardly along said neck portion of said base member in overlying relation and having a skin flange portion projecting generally radially outwardly adjacent said flange portion of said base member, a plastic impregnated element extending around said skin material surrounding said neck portion and spaced radially outwardly from said skin flange portion for forming a first rigid connection of said skin material to said base member, means connected to said propeller hub and including an inwardly projecting retention lip portion substantially surrounding said base member, said lip portion being disposed radially between said skin flange portion and said plastic impregnated element extending around said skin material for forming a second rigid connection of said skin material to said base member, at least one longitudinally extending slot within said core, said slot being disposed at an acute angle relative to the chord of said blade, at least one strip of plastic resin impregnated material extending longitudinally within said slot, and said strip having longitudinally extending edge portions underlying and bonded to said skin on opposite sides of said blade.

9. An aircraft propeller assembly comprising a rotatable propeller hub supporting a plurality of radially extending composite propeller blades, each of the composite blades including an elongated core of substantially rigid plastics material, a skin of plastic resin impregnated material surrounding the core, a rigid base member supporting said core and having an outwardly projecting inner circular flange portion integrally connected to a neck portion of reduced outside diameter, said skin material continuing radially inwardly along said neck portion and flange portion of said base member in overlying relation and having a flange portion projecting outwardly adjacent said flange portion of the base member, means surrounding said skin material overlying said neck portion of said base member and rigidly securing said skin material to said base member, means connected to said propeller hub and including a retention lip portion substantially surrounding said base member radially outwardly of said flange portion of said skin material, a plurality of longitudinally extending slots within said core and extending radially inwardly from the outer end of said core, each said slot being disposed at an acute angle relative to the chord of said blade, at least one strip of plastic resin impregnated material extending longitudinally within each said slot, and each said strip having longitudinally edge portions underlying and bonded to said skin material forming opposite sides of said blade.

* * * * *